US006196247B1

(12) United States Patent
Knoell et al.

(10) Patent No.: US 6,196,247 B1
(45) Date of Patent: *Mar. 6, 2001

(54) VALVE ASSEMBLY AND METHOD FOR ACTUATION OF SUCH A VALVE ASSEMBLY

(75) Inventors: Burkhard Knoell, Lohr; Winfried Rueb, Neustadt, both of (DE)

(73) Assignee: Mannesmann Rexroth AG, Lohr (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/297,821

(22) PCT Filed: Oct. 20, 1997

(86) PCT No.: PCT/DE97/02421

§ 371 Date: May 19, 1999

§ 102(e) Date: May 19, 1999

(87) PCT Pub. No.: WO98/21484

PCT Pub. Date: May 22, 1998

(30) Foreign Application Priority Data

Nov. 11, 1996 (DE) .......................................... 296 22 693 U
Feb. 26, 1997 (DE) .............................................. 197 07 722

(51) Int. Cl.[7] .................................................... F16B 11/04
(52) U.S. Cl. ................................ 137/12; 91/446; 91/447; 91/455; 137/596.15; 137/596.16; 137/596.2; 137/625.68
(58) Field of Search ........................... 91/446, 447, 455; 137/596.15, 566.16, 596.2, 625.68, 12

(56) References Cited

U.S. PATENT DOCUMENTS

| 4,201,052 | | 5/1980 | Breeden et al. . | |
|---|---|---|---|---|
| 4,407,122 | * | 10/1983 | Nanda | 91/455 X |
| 4,475,442 | * | 10/1984 | Breeden | 91/455 X |
| 4,611,527 | * | 9/1986 | Breeden | 91/455 X |
| 4,611,528 | * | 9/1986 | Nanda et al. | 91/455 X |
| 4,753,157 | * | 6/1988 | Lonnemo et al. | 91/455 |
| 4,811,650 | * | 3/1989 | Lonnemo | 91/455 X |
| 4,958,553 | * | 9/1990 | Ueno | 91/447 |
| 5,220,862 | | 6/1993 | Schexnayder . | |

FOREIGN PATENT DOCUMENTS

| 21 18 936 | 2/1973 | (DE) . |
|---|---|---|
| 22 11 404 | 9/1973 | (DE) . |
| 27 05 303 | 8/1978 | (DE) . |
| 27 35 559 | 2/1979 | (DE) . |
| 28 26 610 | 1/1980 | (DE) . |
| 32 47 420 | 7/1984 | (DE) . |
| 36 05 312 | 8/1986 | (DE) . |
| 38 15 968 | 11/1989 | (DE) . |
| 40 31 808 | 4/1992 | (DE) . |
| 44 36 548 | 4/1996 | (DE) . |
| 195 22 746 | 1/1997 | (DE) . |
| 0 163 771 A2 | 12/1985 | (EP) . |
| 2 362 290 | 3/1978 | (FR) . |
| 4-197724 | 7/1992 | (JP) . |

OTHER PUBLICATIONS

"Grundlagen Der Hydraulischen Schaltungstechnik," Ölhydraulik Und Pneumatick, vol. 37, No. 8, Aug. 1, 1993, De–Mainz, pp. 618–621.

* cited by examiner

Primary Examiner—Gerald A. Michalsky
(74) Attorney, Agent, or Firm—Oliff & Berridge, PLC

(57) ABSTRACT

A valve assembly for actuation of a user and a method for actuation of the valve assembly, wherein a supply throttle device and a drain throttle device may be actuated independent of each other, is disclosed. In the case of single-action users, the drain throttle device is actuated such that the open cross-section of the drain throttle is maximum upon attaining the desired volumetric flow of hydraulic oil, so that the energy losses in the drain conduit are reduced to minimum.

16 Claims, 7 Drawing Sheets

VALVE ASSEMBLY AND METHOD FOR ACTUATION OF SUCH A VALVE ASSEMBLY

BACKGROUND OF THE INVENTION

The invention relates to a valve assembly for actuation of a user, and a method for actuating such a valve assembly.

The like valve assemblies are employed in mobile hydraulics for actuating single and double-action users such as, for example, hydraulic motors or power lifters. Herein a throttle device whereby the supplied or drained volumetric flow of hydraulic oil may be throttled is arranged in each of the work conduits leading to the user, i.e., in the supply conduit and in the drain conduit.

In FIGS. 1 to 3, which shall even now be referred to, several exemplary applications of such known throttle devices are represented.

FIG. 1 shows a valve assembly for actuating a double-action user which may, for example, be a lifting cylinder 200. To the cylinder chamber and to the annular chamber of the lifting cylinder 200 a work conduit 206 or 208 is connected. For outward movement of the lifting cylinder 200, the hydraulic oil is supplied via work conduit 206 to the lifting cylinder 200, with the hydraulic oil displaced from the annular chamber being returned to the tank through the work conduit 208 which acts as a drain conduit.

For the purpose of throttling the hydraulic oil supply and drain, two valve throttles 210, 212 are arranged in the two work conduits 206 and 208, the valve members of which are coupled mechanically. The ratio of supply and drain opening of the valve throttles is determined by the mechanical coupling of the opening lands of the common spool, so that at a particular setting of the valve throttle 210, a pressure loss $\Delta p2$ will ensue in the drain conduit (work conduit 208). This pressure loss is undesirable in particular in where single-action users are connected as it does not fulfil a meaningful function. The pressure loss results in energy losses, in heating of the hydraulic oil, and eventually in premature wear of the valve throttle.

In FIG. 2 a valve assembly for actuating a blower motor 214 is represented. In this alternative, two independently apportionable valve throttles 210, 212 are used which may each be employed in a motor having two directions of rotation for throttling of the volumetric flow of hydraulic oil in the supply conduit. In a case where a motor having one direction of rotation is used, drain throttling—in this case the valve throttle 212 in the drain conduit 208—causes unnecessary pressure losses, so that the above specified drawbacks also exist in this type of valve assembly.

FIG. 3 shows an application wherein a lifting cylinder 200 is used for lifting or lowering an extension arm 215 of lifting gear 216. In order to lift the load m, the cylinder chamber of the lifting cylinder 200 is supplied with hydraulic oil, so that the cylinder moves outward and the extension arm 215 is moved upward in the representation of FIG. 3. The hydraulic oil present in the annular chamber is displaced as a result of the outward movement and returned to the tank. As a result of the load m exerting a tensile force on the extension arm 215, a resulting force acts on the lifting cylinder 200 which is maximum when the extension arm 215 extends horizontally and diminishes concurrently with a rotation of the extension arm 215 from this horizontal position. The further the extension arm 215 is lowered into the horizontal position, the higher becomes the weight on the drain side of the lifting cylinder 200, so that the latter is pressed downward in the representation of FIG. 3. Due to the rising volumetric drain flow Q2, cavitation may occur in the supply conduit which continues to receive a volumetric supply flow Q1, whereby the components of the valve assembly are strained in a maximum degree, which may also bring about control instability. For this reason it is also necessary to adapt drain throttling to the lifting conditions of the lifting gear. Under particular operating conditions, such drain throttling generates pressure losses which are not acceptable for the above named reasons.

In order to avoid such unnecessary pressure losses, so-called "non-pressurised tank returns" have, for example, been provided in motor applications for farming tractors, which may be connected to the drain side of the motor by means of a quick coupling and whereby the drain throttle may be bypassed. It is a drawback in such an auxiliary construction that the vehicle must be provided with a separate tank connection piece including a quick coupling, and that the operator must manually connect the non-pressurised tank return. Such an auxiliary construction can be sensibly employed only if it is intended to maintain the respective operating condition over a prolonged period of time. In the case of a change of user actuation, for example a reversal of direction of rotation of the motor etc., ports must be reconnected, so that the requirements in terms of operation are considerably high.

SUMMARY OF THE INVENTION

An object of the present invention is furnishing a valve assembly and a method for controlling a valve assembly, wherein the energy losses in the drain of a user may be reduced to minimum at minimised expense in terms of device technology.

This object is attained by a valve assembly for actuation of a user, comprising a continuously adjustable directional control valve acting as a supply throttle whereby a pump port may be connected to user ports. In the assembly, the user is connected through work conduits to the directional control valve, and in each work conduit a throttle device is arranged such that the drain volumetric flow of hydraulic oil from the user may be adjusted. In addition, each throttle device may be controlled to be open entirely independent of a spool position of the directional control valve.

The present invention is also directed to a method for actuation of such a valve assembly comprising adjusting the volumetric supply flow to the user by actuating the directional control valve and controlling the drain-side throttle device to be entirely open.

By the measure of designing the valve assembly to include throttle devices in the supply and drain conduits and designing them such as to be actuatable independently of a supply throttle, the respective throttle device acting as a drain throttle may at the port of single-action users etc. be set to a maximum cross section of flow, so that the pressure losses in the drain are minimised. The hydraulic oil volume flow is adjusted by means of a directional control valve acting as a supply throttle.

It is preferred to provide the throttle device with two functions, so that it will act as a releasable non-return valve in its one function and may be used for throttling the volumetric supply or drain flow by means of an additional metering land in its other function.

Particularly simple actuation of the throttle device and of the directional control valve acting as a throttle is obtained if a control side of the directional control valve and one of the throttle devices receive an equivalent control signal.

The throttle device may be designed as a directional control valve including a non-return position and several continuously adjustable flow positions or as a throttle device with separate function elements such as, for example, a main poppet and a push-open piston which are mechanically coupled to each other.

For actuation of the valve assembly according to the invention, three variants were found to be particularly advantageous.

In the first variant, initially only the control pressure for the drain-side throttle device is increased while the other control pressure for the supply-side throttle device is maintained constant—preferably at Zero. The first control pressure is increased until a predetermined control pressure difference is established, whereby the directional control valve acting as a supply throttle may be moved into a predetermined position for adjusting the hydraulic volumetric flow. Subsequently, while retaining the control pressure difference, both control pressures are increased until the control pressure for controlling the drain-side throttle device reaches a maximum value as the latter is controlled entirely open.

By proceeding in this manner it is achieved that the drain-side throttle device is controlled to be entirely open which thus generates a minimum pressure loss, with the possibility of adjusting any desired pressure difference at the supply throttle (directional control valve).

In an alternative method, the control pressures for the drain-side throttle device and for the supply-side throttle device are increased simultaneously, with the former control pressure being increased more rapidly than the latter control pressure. This increase of both control pressures is carried out until the predetermined pressure difference has established and the control pressure for the drain-side throttle device is controlled entirely open, so that the flow through it, in turn, takes place at minimum pressure loss.

In another alternative method, initially both control pressures are taken to their maximum values, with the control pressure for the supply-side throttle device subsequently being lowered until the predetermined control pressure difference at the directional control valve is established. In this variant, too, it is ensured that the drain-side throttle device is controlled entirely open upon adjustment of the control pressure difference.

DETAILED DESCRIPTION OF PREFERRED EMBODIMENTS

Figure 3:
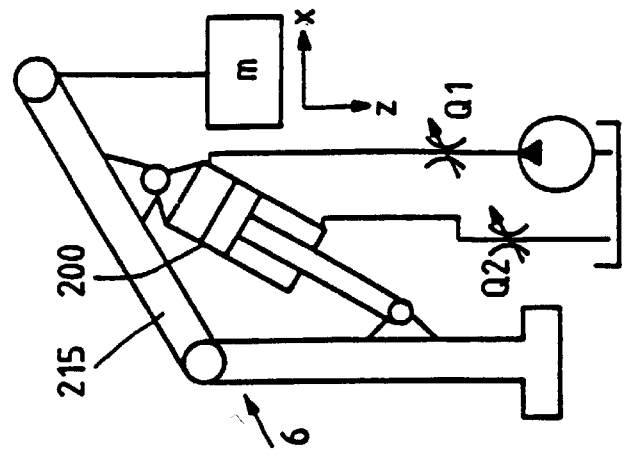
FIG. 3 shows a known valve assembly for actuation of lifting gear.
Figure 2:
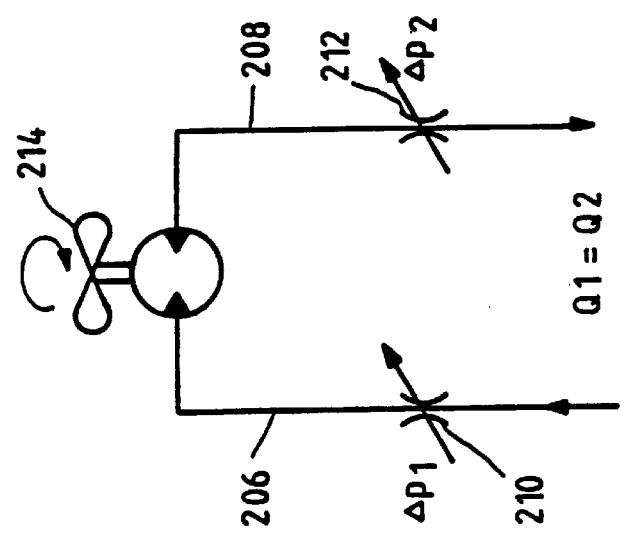
FIG. 2 shows a known valve assembly for actuation of blower drive having one sense of rotation.
Figure 1:
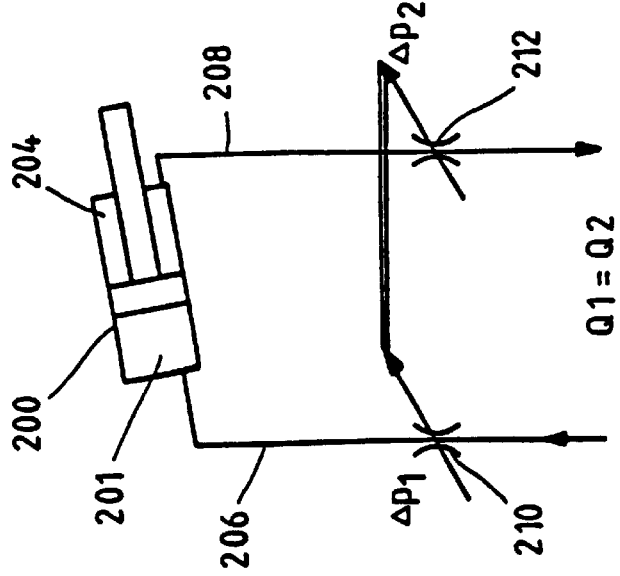
FIG. 1 shows a known valve assembly for actuation of a user including supply and drain throttling.
Figure 4:
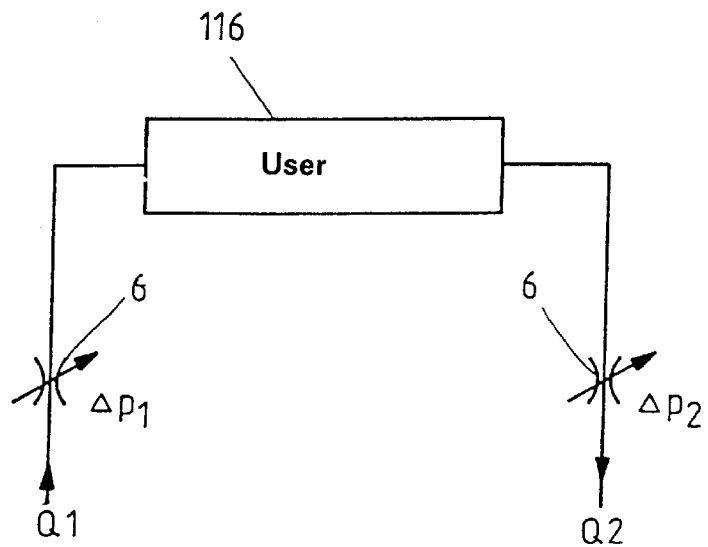
FIG. 4 is a strongly simplified schematic diagram of the valve assembly according to the invention.

FIG. 4 represents the logic of a valve assembly according to the invention for actuation of a user 116. To this user two work conduits are connected as supply and drain conduits, wherein one respective throttle device 6 each for control of the volumetric flow are arranged, so that the volumetric flow of the hydraulic oil to and/or from the user may be adjusted. In the case of a double-action user, the two throttle devices 6 are controlled such that the volumetric flow of supply conduit Q1 is equal to the volumetric flow in drain conduit Q2. Control is performed through control signals 1, 2 output from control means which are not represented. The independent supply and drain control according to the invention makes it possible to entirely open the throttle device 6 in the drain conduit at the port of single-action users, so that the pressure loss in the drain conduit and thus heating of the hydraulic oil and wear of the components are reduced to minimum.

Figure 5:
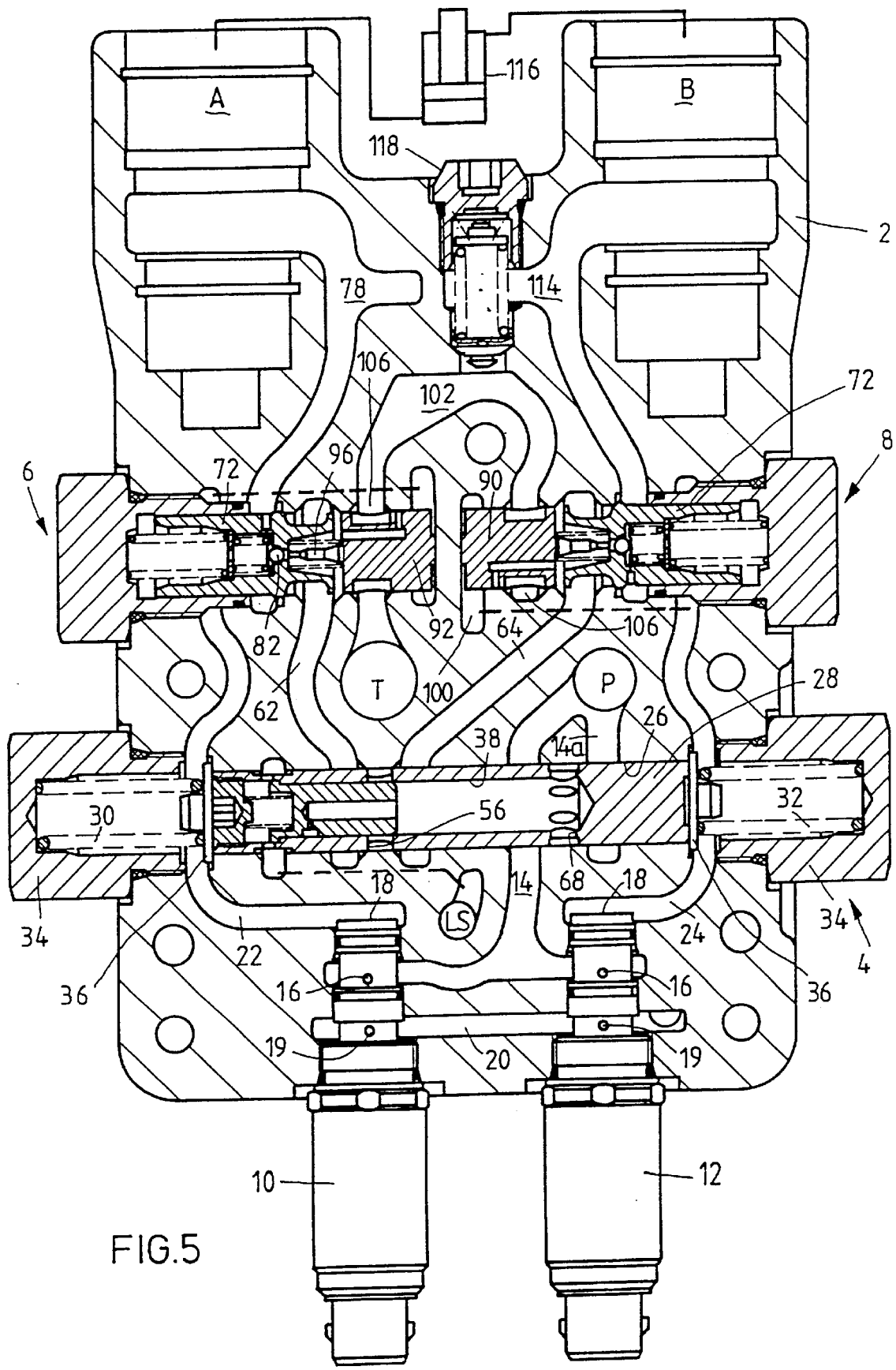
FIG. 5 is a sectional view of a valve assembly according to the invention.
Figure 6:
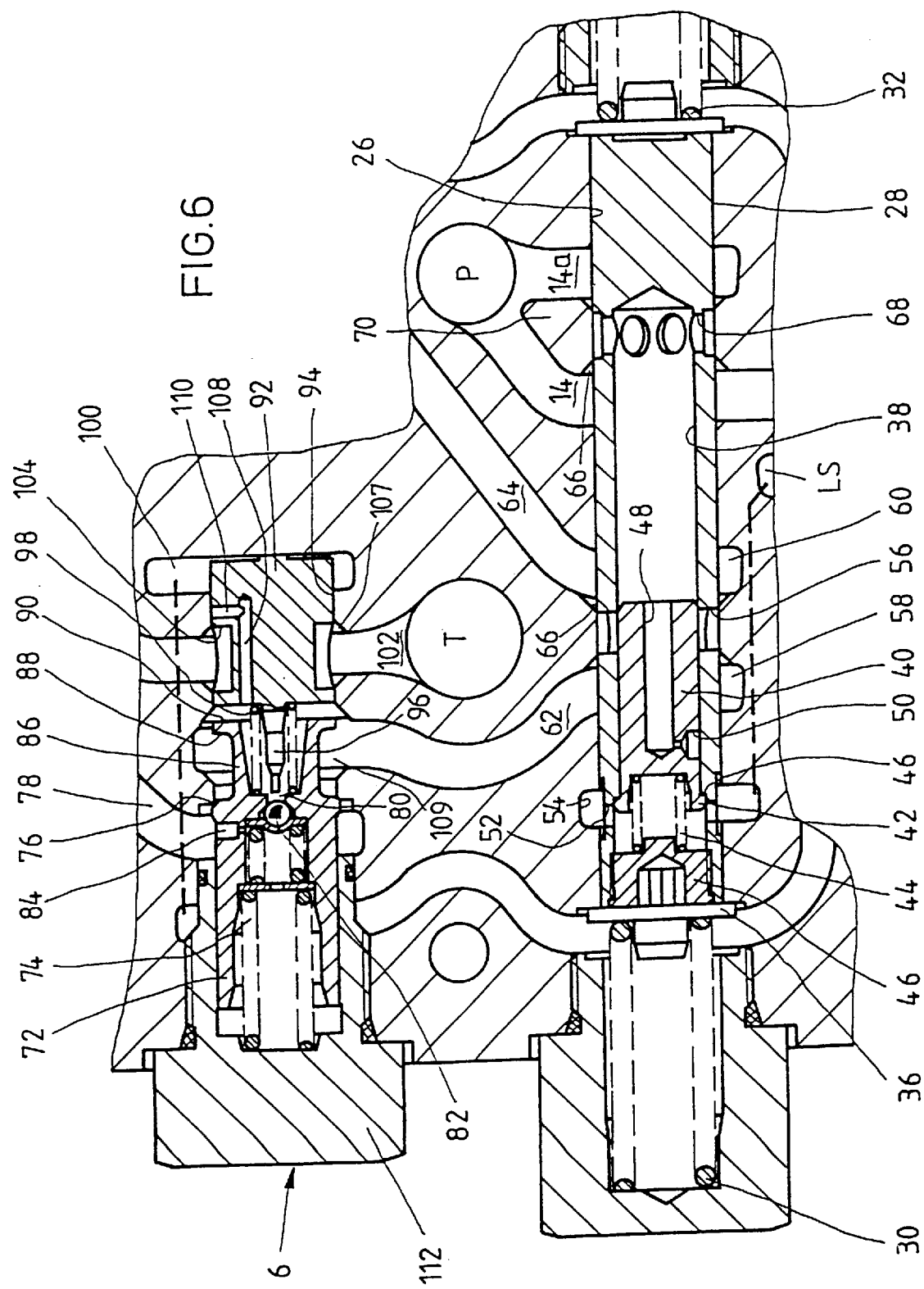
FIG. 6 is a partial representation of the valve assembly of FIG. 5.

FIGS. 5 and 6 show a specific embodiment for a like valve assembly for actuation of single and double-action users. Such a valve assembly is described in U.S. patent application Ser. No. 09/297,822 by the same applicant, the disclosure of which is herewith incorporated into the contents of the instant application.

FIG. 5 shows a sectional view of a valve assembly in disk design. The valve disk or plate forms a valve housing 2 in which receiving bores for a continuously adjustable directional control valve 4 and two throttle devices 6, 8 are formed.

The two throttle devices 6, 8 are arranged along a common axis which extends at a parallel distance from the axis of the directional control valve 4.

Two pilot valves 10, 12 in cartridge design are furthermore screwed into the valve housing 2, whereby the directional control valve 4 and the two throttle devices 6, 8 are controlled. These pilot valves 10, 12 are, for example, electrically actuated pressure reducing valves whereby the pressure at a pump port P, which is guided via a pump passage 14 to radial ports 16 of the pilot valves 10, 12, may be reduced to a system pressure at the axial outlet port 18 of the respective pilot valve 10, 12. Each pilot valve 10, 12 moreover includes a radial port 19 opening into a tank passage 20 through which excessive hydraulic fluid may be returned to a tank port T.

The outlet port 18 of each pilot valve 10, 12 opens into a control passage 22 and 24, respectively, opening into a valve bore 26 in which a spool 28 of the directional control valve 4 is guided. The two control passages 22, 24 open onto the two sides of the spool end sides, so that these receive the pressure in the respective control passage 22, 24, i.e., the output pressure of pilot valve 10 or 12.

The spool 28 is moreover biased into its represented Zero position by two pressure springs 30, 32 acting on the end surfaces. The valve springs are supported on the internal bore of closure caps 34 screwed into the valve housing 2 and thus forming the axial termination of the valve bore 26. The other ends of the pressure springs 32, 34 contact a respective spring retainer 36 which, in the represented Zero position, is supported with a circumferential portion at a housing shoulder.

The detailed structure of the directional control valve 4 and of a throttle device 6 shall now be explained by referring to FIG. 6 which shows these components in an enlarged representation.

In the left-hand end portion of the spool 28 in the representation of FIG. 6, a pocket-hole type internal bore 38 is provided in which a pressure compensator piston 40 is guided in axial displacement. In the Zero position shown in FIG. 6, the pressure compensator piston 40—hereinafter referred to as piston 40—has a radial collar 42 contacting an abutment shoulder 46 of the internal bore 38. The piston 40 is biased in the direction toward this contact position by a control spring 44. The control spring 44, in turn, is supported at a termination screw 46 which is screwed into the annular jacket of the spool 28 and which, jointly with the annular jacket end surface, forms the contact surface for the spring retainer 36 (on the left in FIG. 6). The piston 40 includes a connecting bore with an axial pocket hole bore and a radial throttle bore which opens at the outer circumference of the piston 40.

In the range of the radial collar 42, there is formed in the annular jacket of the spool 28 a compensating bore 52 which opens into an annular control chamber 54 connected to a control port LS through a conduit indicated by a dashed line, so that a control pressure corresponding to the load pressure may be applied in the spring chamber.

In the central range of the spool 28 an outlet bore star 56 is formed to which two annular chambers 58 and 60 connected to respective connecting passages 62 and 64 are associated. These connecting passages 62, 64 lead to inlet ports of a respective throttle device 6 and 8. The annular chambers 58, 60 are provided with chamfers 66 which, upon axial displacement of the spool 28, enable fine opening control of the outlet bore star 56. The axial length of the piston 40 is selected such that in the Zero position (FIG. 6) the outlet bore star 56 is closed off by the right-hand end portion of the piston 40. The radial throttle bore 50 is then closed by the inner peripheral wall of the internal bore 38.

In the range of the inner end portion of the internal bore 38 there opens an inlet bore star 68 closed off in the Zero position by a web 70 formed between the pump passage 14 and a pump branch passage 14a. The two pump passages 14, 14a extend approximately in a radial direction with respect to the valve bore 26. The internal bore 38 is in turn provided with chamfers 66 for fine control in the range of the web 70.

The inlet bore star 68 and the pump passages 14, 14a including the corresponding annular chambers constitute an adjustable metering orifice, whereas the piston 40 and the outlet bore star 56 constitute a metering throttle whereby the system pressure downstream from the metering orifice is throttled to the load pressure in the connecting passages 62 and 64. Serial arrangement of the metering orifice and of the metering throttle ensures that the pressure drop across the metering orifice (inlet bore star 68) will remain constant independent of the pressure in the connecting passages 62, 64.

As was already mentioned above, the spring chambers of the pressure springs 30, 32 are connected to the control passages 22 and 24, so that the control pressure prevails at the end surfaces.

The two throttle device 6, 8 are of identical construction, so that only the throttle device 6 represented in FIG. 6 shall be described for the sake of simplicity. This throttle device includes a main poppet 72, a conical section of which is pressed against a valve seat 76 by a check spring 74, so that in this closing position the connection from the connecting passage 62 to a work passage 78 is interrupted.

In the shown embodiment the main poppet 72 is designed with a pilot opening 80 closed by a ball 82 which is pressed against a pilot opening seat by the check spring 74 and a spring retainer. Into the spring chamber of the check spring 74 there opens a throttle bore 84 which, in turn, communicates with the work passage 78. At the right-hand end portion in the representation of FIG. 6 a hub-shaped projection 86 is formed, at the outer circumference of which an annular groove 88 is provided. The internal bore of the hub-shaped projection 86 extends conically toward the pilot opening 80.

The annular end face 90 of the projection 86 serves as a contact surface for a push-open piston 92 guided coaxially with respect to the main poppet 72 in a receiving bore 94. At its end portion adjacent the main poppet 72, the push-open piston 92 includes a tappet 96 which plunges into the internal bore of the hub-shaped projection 86 and the end portion of which has a smaller diameter than the pilot opening 80, so that the tappet 96 may also plunge into this pilot opening 80. The push-open piston 92 is biased against the end surface of an annular chamber 100 of a receiving bore 94 by means of a spring 98. In this stop position there exists between the annular end surface 90 and the adjacent end surface of the push-open piston 92 a predetermined gap which is greater than the distance from the end portion of the tappet 96 to the outer circumference of the ball 82.

At the outer circumference of the push-open piston 92 in the range of a tank passage 102 opening into the receiving bore 94, several recesses 104 distributed over the circumference are formed, whereby in the case of an axial displacement of the push-open piston 92 the tank passage 102 may be connected to the work passage 62 which communicates with the receiving bore 94 via an annular chamber 109.

In the push-open piston 92 there is moreover provided a relief bore, the axial portion 108 of which opens into the left-hand end surface in accordance with the representation of FIG. 6, and which opens between the annular chamber 106 of the tank passage 102 and the annular chamber 100 (basic position) via a radial portion 110. The annular chamber 106 of the tank passage 102 is also provided with fine control chamfers 107. The axial portion 108 opens radially within the annular end face in the internal bore of the projection 86.

As can further be seen from FIG. 6, the left-hand portion of the main poppet 72 is guided in the internal bore of a closure plug 112 which is screwed into the left-hand end portion of the receiving bore for the non-return valve. The control passage 22 is prolonged from the left-hand end surface of the spool 28 as far as into the range of the closure plug 112 and from there—as is indicated by the dashed line—as far as to the annular chamber 100, so that in the latter the control pressure applied by the pilot valve 10 may be adjusted, which acts on the push-open piston 92 against the force of the spring 98.

As can be seen from FIG. 5, the tank passage 102 leads to the annular chamber 106 of the (right-hand) throttle device 8, and the annular chamber 100 is connected to the control passage 24 via the passage indicated by a broken line, so that the push-open piston 92 of the throttle device 8 receives the control pressure applied by the pilot valve 12 in the direction toward the main poppet 72, whereas the push-open piston 92 of the throttle device 6 is driven by the pilot valve 10.

When the main poppet 72 of the throttle device 8 is raised, a connection is controlled open to a work passage 114 which leads to a work port B of the valve assembly. The work passage 78 of the throttle device 6 leads to a work port A. The two ports A, B may be coupled to a user, for example to the cylinder chamber or the annular chamber of a lifting cylinder 116. The connection may, for example, be realised by means of hose couplings.

Between the tank passage 102 and the work passage 114, a connecting passage is provided in which a conventional non-return valve 118 is arranged which, upon excessive pressure build-up in the tank T, permits a flow from the tank passage 102 to the work passage 114, however prevents a reverse flow.

The function of the valve assembly represented in FIGS. 5 to 6 shall be explained briefly in the following.

For an outward movement of the lifting cylinder 116 the cylinder chamber must be supplied with hydraulic fluid via work port A. For this purpose the pilot valves 10 and 12 are energised so that a control pressure difference is built up, the resultant force of which acts on the right-hand end surface of the spool 28 in the representation of FIG. 5, so that the spool 28 is displaced to the left against the force of the pressure spring 30, the inlet bore star 68 is controlled open, and hydraulic fluid from the pump passage 14 may enter into the internal bore 38. The control pressure applied through the pilot valve 10 is so weak, for example, that the throttle device 6 remains in its check position. As a result of the pump pressure, the piston 40 is raised from its stop position, so that the outlet bore star 56 is controlled open against the force of the control spring 44, and the load pressure until equilibrium is established between the piston spring side and the front side (on the right in FIG. 5). The hydraulic fluid may now enter from the internal bore 38 through the opened outlet bore star 56 into the connecting passage 62, so that the main poppet 72 is acted on in the opening direction—i.e., against the force of the check spring 74. In the case of sufficient pump pressure—more precisely: output pressure at the pressure compensator—the main poppet 72 is raised from its valve seat, so that the hydraulic fluid may flow through the work passage 78 to the port A and from there into the cylinder chamber of the lifting cylinder 116.

Due to the pressure build-up in the cylinder chamber, hydraulic fluid is displaced from the annular chamber of the lifting cylinder 116 and guided to the throttle device 8 via port B and the work passage 114.

The control pressure generated by energisation of the pilot valve 12 also prevails in the annular chamber 100 and thus at the back side of the push-open piston 92, so that the latter is moved against the force of the spring 98 (FIG. 6) to the right in the representation of FIG. 5. Following a predetermined stroke, the tappet 96 of the push-open piston 92 enters into contact with the ball 82, so that the latter is raised from its seat against the bias of the check spring 74. The main poppet 72 remains in contact with its seat. Owing to the axial displacement of the push-open piston 92, the radial portion 110 of the compensating bore is controlled open by the control land of the annular chamber 106, so that the tank pressure prevails in the compensating bore and in the bore of the projection 86.

As the throttle bore 84 has a considerably smaller diameter than the pilot opening 80, the pressure in the spring chamber of the check spring 74 is reduced because hydraulic fluid cannot follow suit quickly enough from the work passage 114 through the small throttle bore 84. Hereby the load on the spring side of the main poppet 72 is reduced. Owing to the effect of the control pressure, the push-open piston 92 is moved into its stop position against the projection of the main poppet 72 while the ball 82 is in the open position, so that the said main poppet is drivingly engaged by the push-open piston 92 and raised from its valve seat. In this stop position the end surface of the push-open piston 92 and the annular end face 90 of the main poppet 72 sealingly contact each other, so that the internal bore of the projection 86 is sealed from the outer circumference.

By the axial displacement of the push-open piston 92 and of the main poppet 72 contacting the latter, the work passage 114 is connected via the annular groove 88 to the annular chamber 109 which, in turn, is connected via the recesses 104 to the tank passage 102, with this latter connection being controlled open by the recesses 104. The hydraulic fluid may now flow back from the work passage 114 into the tank passage 102 and thus to the tank port T.

The outward movement of the lifting cylinder 116 is terminated by de-energising the pilot valve 12, so that both main poppets 72 of the throttle devices 6, 8 are again returned into their closing positions and the hydraulic fluid is confined leak-free between the throttle devices 6, 8 and the lifting cylinder 116.

Figure 7:
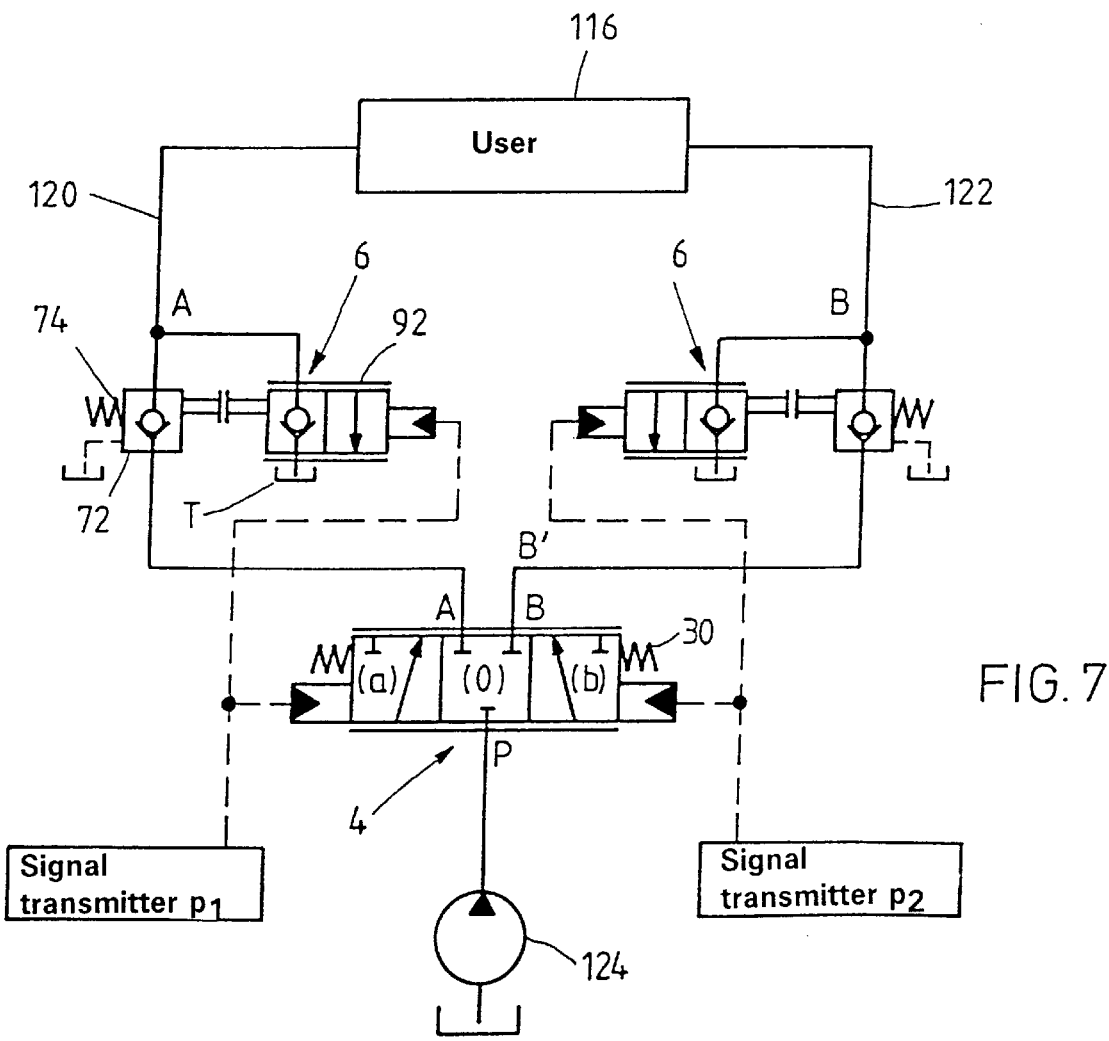
FIG. 7 is a simplified hydraulic circuit diagram of the valve assembly of FIG. 5.

FIG. 7 shows the basic concept of the valve construction in accordance with FIGS. 5 and 6, wherein the individual valve members (throttle device 6, directional control valve 4) are represented in the form of strongly simplified symbols which may be realised in various manners.

The directional control valve 4 is designed with two outlet ports A, B, and one pump port P to which a hydraulic pump 124 is connected. At the two work ports A, B, respective work conduits 120 and 122 are connected which lead to the user 116 and in each of which a respective one of the throttle devices 6 having an identical construction is arranged. As is indicated in FIG. 7, each of the throttle devices 6 realises a non-return valve including an additional metering land for adjusting the hydraulic volumetric flow. In the specific embodiment represented in FIGS. 5 and 6, the non-return valve is fundamentally constituted by the main poppet 72, and the metering land through co-operation of the push-open piston 92 with the main poppet 72. Mechanical coupling of the push-open piston 92 to the main poppet 72 is indicated schematically in FIG. 7.

At the left-hand control side in FIG. 7 of the directional control valve 4 designed as a proportional valve, it is possible to apply a control signal which may also be applied to the control side of the throttle device 6 which is biased into its check position by the check spring 74. Correspondingly, at the other control side of the directional control valve 4 a second control signal is applied which is also guided to the control side of the drain-side throttle device 6. The control signals may, for example, be pilot pressures p1, p2. It is, of course, also possible to use electrical signals instead of control pressures.

When a pressure difference p2−p1 is applied, the spool of the directional control valve 4 is taken from the central cut-off position shown under (0) into one of the flow positions designated by (b) wherein the ports P and A are connected to each other. The control pressure p1 is chosen such that the throttle device 6 remains in the check position shown in FIG. 7. By the higher signal pressure p2 the throttle device 6 in the work conduit 122 (drain side) is taken from the check position into the throttling position wherein— thanks to the additional metering land—throttling of the volumetric drain flow may be effected. In the case of single-action users 116, for example, control of the volumetric flow in the drain work conduit 122 is not required, so that according to the method of the invention the control pressure p2 is chosen such that the drain-side throttle device 6 is taken into a flow position having a maximum open cross-section, and thus the pressure losses in the drain work conduit 122 are reduced to minimum.

The method for actuation of the valve assembly according to the invention shall be explained in more detail hereinbelow.

Figure 8:
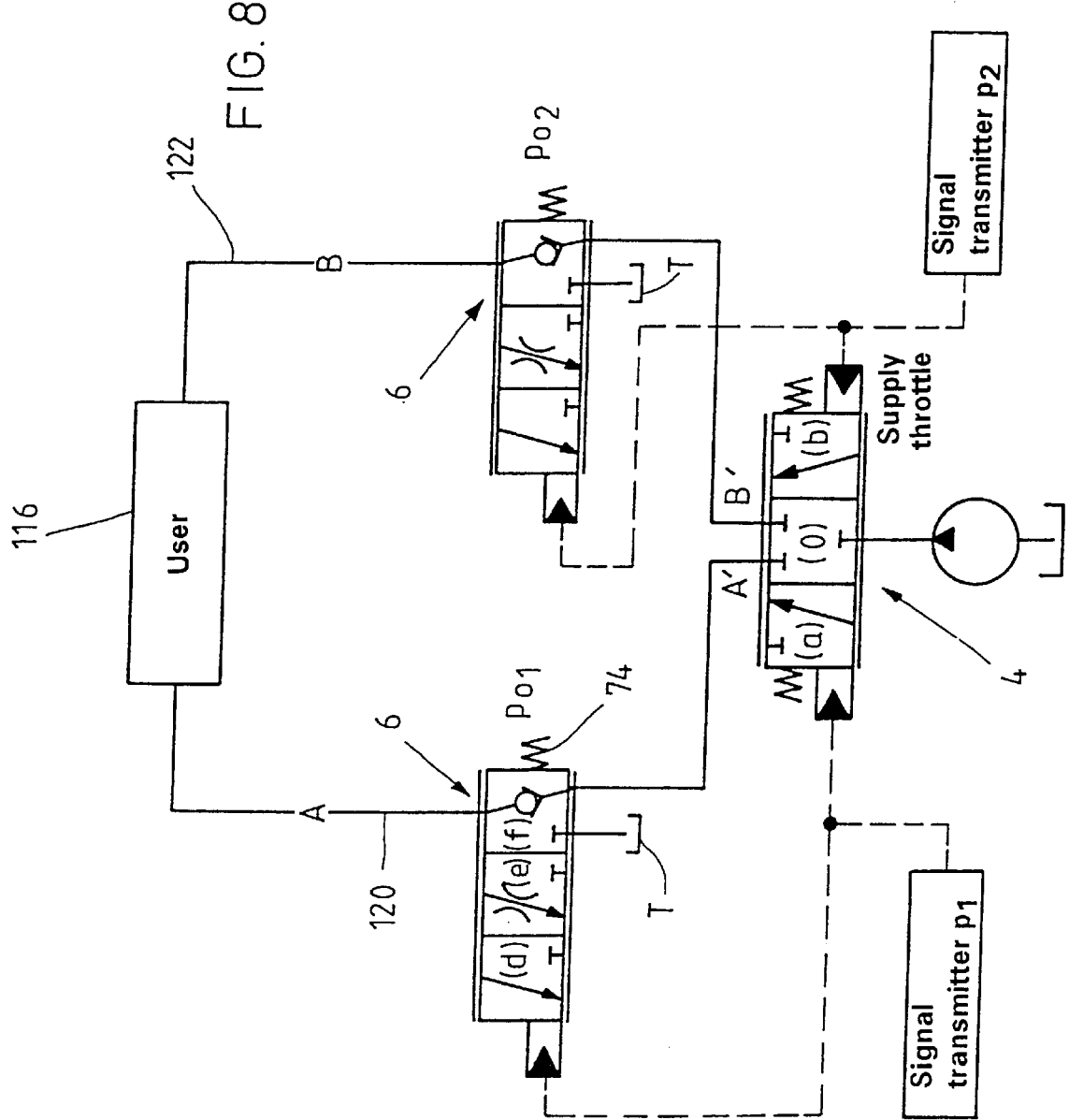
FIG. 8 is a hydraulic circuit diagram of a second embodiment of the valve assembly according to the invention.

In FIG. 8 the valve logic of another embodiment of a valve assembly according to the invention is represented. This valve assembly differs from the valve assembly represented in FIG. 7 merely in the fundamental structure of the throttle device 6. In the embodiment represented in FIG. 7, each throttle device 6 was constituted by a non-return valve assembly and a valve assembly realising the additional metering land, which were mechanically coupled to each other. In the embodiment represented in FIG. 8, the throttle device 6 is realised by a continuously adjustable directional control valve which, in a terminal position designated by (f), acts as a non-return valve preventing return flow from the user to the directional control valve 4. In the flow position designated by (e), throttling of the volumetric hydraulic flow in the work conduits 120 and 122 is effected, and in the terminal position designated by (d), the spool of the throttle device 6 is in a position in which the open cross-section assumes a maximum value, so that the hydraulic oil may return at minimum energy losses from the user 116 to the tank T. The further components of the valve assembly represented in FIG. 8 correspond to the construction represented in FIG. 7, so that a description of these further components may be omitted. The two throttle devices 6 are biased into their check position by the check spring 74. As soon as a force exceeding the check spring force is applied to the control side of the throttle device 6 by the control pressure p1, p2, the spool of the throttle device 6 is taken into its flow positions designated by (d) and (e) which permit a return flow from the user 116 to the tank T.

Several methods for actuation of the above described valve assemblies shall now be explained by referring to the following figures.

Figure 9:
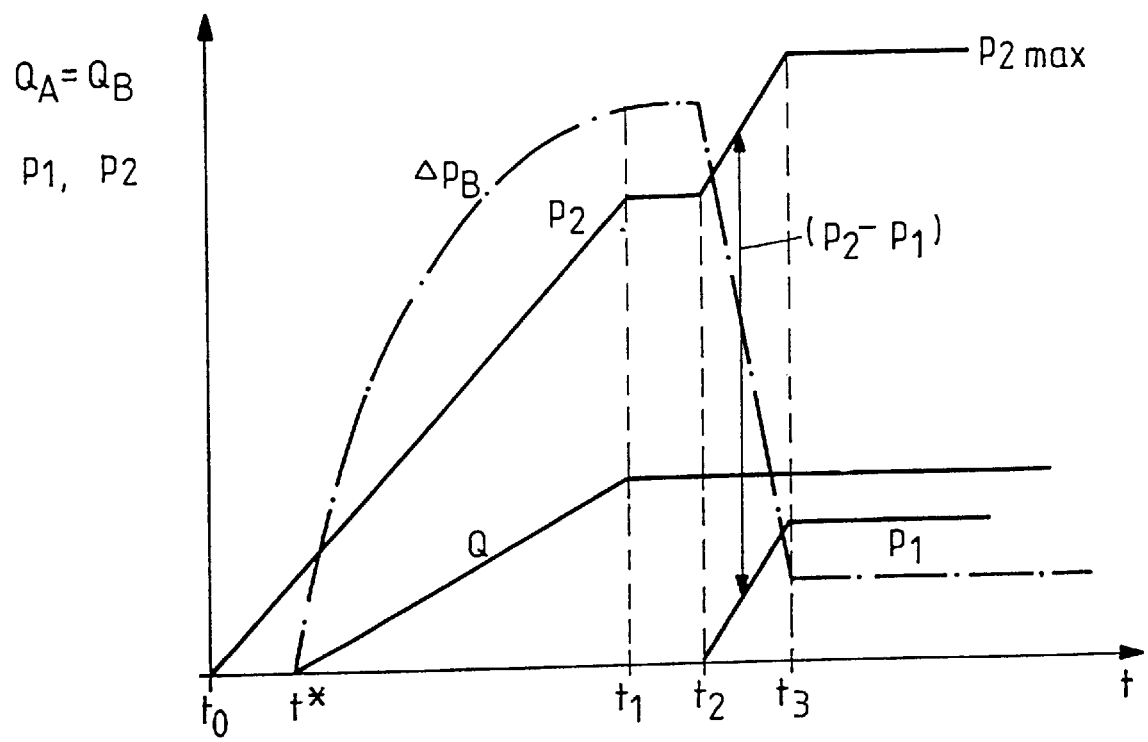
FIG. 9 is a diagram explaining actuation of the valve assemblies of the invention in accordance with a first method.

FIG. 9 shows a diagram in which the supply and drain side volumetric flows $Q_A$ and $Q_B$ and the control pressures p1, p2 applied to the control sides of the directional control valve 4 and to the throttle device 6 are represented as a function of the time t. As the volumetric flows $Q_A$ and $Q_B$ are equivalent, they are subsumed under Q in the diagram of FIG. 9 for the sake of simplicity. According to the control method represented in FIG. 9, the control pressure p2 for the drain-side throttle device 6 is initially increased continuously in the work conduit 122 within a time interval ($t_1$–$t_0$). As a result of the applied signal pressure p2 the spool of the directional control valve 4 is taken into one of the flow positions designated by (b) wherein the pump port P is connected to the work port A, so that hydraulic oil is taken through the work conduit 120 to the supply-side throttle device 6. As the signal pressure p1 still is Zero in this time interval, the throttle device 6 remain in its check position. As a result of the applied signal pressure p2 the bias of the check spring 74 of the drain-side throttle device 6 arranged in the work conduit 122 is overcome, so that the said throttle device is taken into one of its flow positions wherein throttling of the drain volumetric flow is effected. accordingly, the volumetric flow Q of hydraulic oil and the pressure loss $\Delta P_B$ at the drain-side throttle device 6 increase, with this increase only taking place after a time t* in which the control pressure p2 reaches a value at which the force of the bias spring of the directional control valve 4 may be overcome to displace the spool of the directional control valve.

After the time $t_1$ the control pressure p2 is initially kept at a constant level, so that a desired volumetric flow Q is established. Accordingly, a further increase of the pressure loss $\Delta p_B$ does not take place in the time interval $t_2$–$t_1$. Following adjustment of a constant volumetric flow Q, both control pressures p2 and p1 are then increased with an identical pressure gradient, so that the control pressure difference (p2–p1) remains unchanged. This increase of the control pressures takes place until the control pressure p2 for the drain-side throttle device 6 has reached a maximum value ($p2_{max}$). At this control pressure, the open cross-section of the throttle device 6 (Ill. 7 or Ill. 8) is maximum, so that the pressure loss $\Delta p_B$ correspondingly drops to a minimum value. This minimum value of the pressure loss $\Delta p_B$ is reached after a time $t_3$ after which the two control pressures p2 and p1 are kept at a constant level.

I.e., after lapse of the time $t_3$, the volumetric flow Q is adjusted to the desired value by applying the pressure difference p2–p1 by means of the directional control valve 4, the supply-side throttle device 6 is located in the check position preventing a return flow of the hydraulic oil from the user 116 to the directional control valve 4, and the drain-side throttle device 6 is opened entirely, so that the pressure loss $\Delta p_B$ is reduced to a minimum value. Here it must, however, be noted that the signal pressure p1 for the supply-side throttle device 6 is adjusted to a value such that the force acting on the control side is smaller than the one of the check spring 74, so that the supply-side throttle device 6 remains in the check position.

The control method represented in FIG. 9 is suited for all of the above described variants of construction.

In the variants represented in FIGS. 5 to 7, wherein the throttle devices include a non-return valve assembly and an additional, constructionally separate metering land 92 which, for example, are realised by the main poppet 62 and the push-open piston 92, it may happen that upon exceeding a signal pressure p1 the metering land of the supply-side throttle device 6 controls open the connection to the tank T, resulting in a "short circuit" in which both the work port A of the directional control valve as well as the user are connected to the tank T. Such a short circuit is precluded by the control method represented in FIG. 9 because there the signal pressure for the drain-side throttle device is initially raised to a high value before the control pressure p1 for the supply-side throttle device is increased.

In the following figures, control methods are represented wherein such a short circuit cannot be excluded, so that these control methods are particularly suited for valve assemblies presenting the structure represented in FIG. 8.

Figure 10:
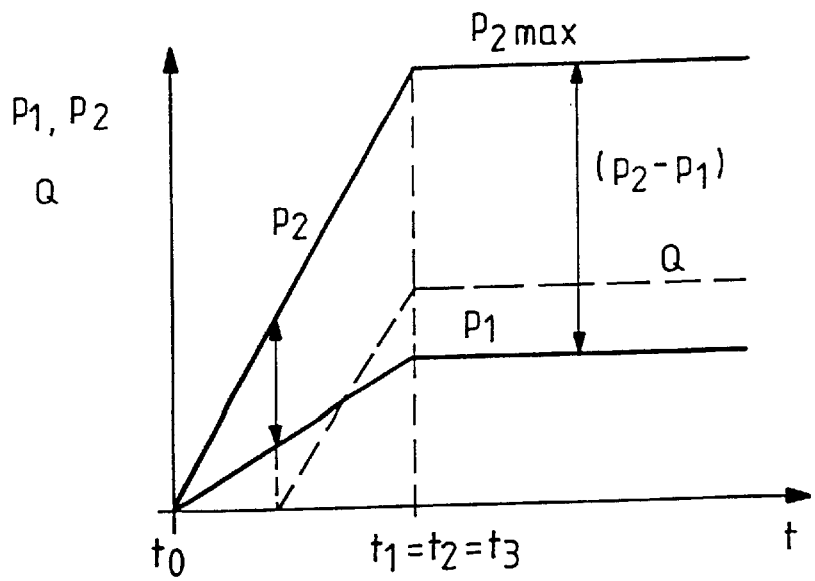
FIG. 10 is a diagram explaining actuation of the valve assemblies of the invention in accordance with a second method.

In accordance with FIG. 10, both control pressures p2 and p1 are increased concurrently and with different pressure gradients in the second alternative control method, so that the control pressure p2 for the drain-side throttle device 6 rises more sharply. Upon reaching a control pressure difference, the force of the pressure spring 30 of the directional control valve 4 is overcome, so that the latter correspondingly is taken into one of flow positions b, so that the accordingly the volumetric hydraulic flow rises. The control pressure gradients are chosen such that the control pressure p2 will attain a maximum value when the predetermined control pressure difference (p2–p1) is adjusted which is necessary for adjusting the desired volumetric flow Q. I.e., in the method shown in FIG. 10, the pressure gradients are preferably chosen such that the control pressure for the supply-side throttle device 6 and the control pressure p2 for the drain-side throttle device 6 will always attain a maximum value, so that the drain throttle is set to a maximum cross-section of flow. Following adjustment of the maximum control pressure p2 and of the desired control pressure difference (p2–p1), both control pressures p1, p2 are held at a constant level, so that the volumetric flow Q also constantly remains at the predetermined value.

Figure 11:
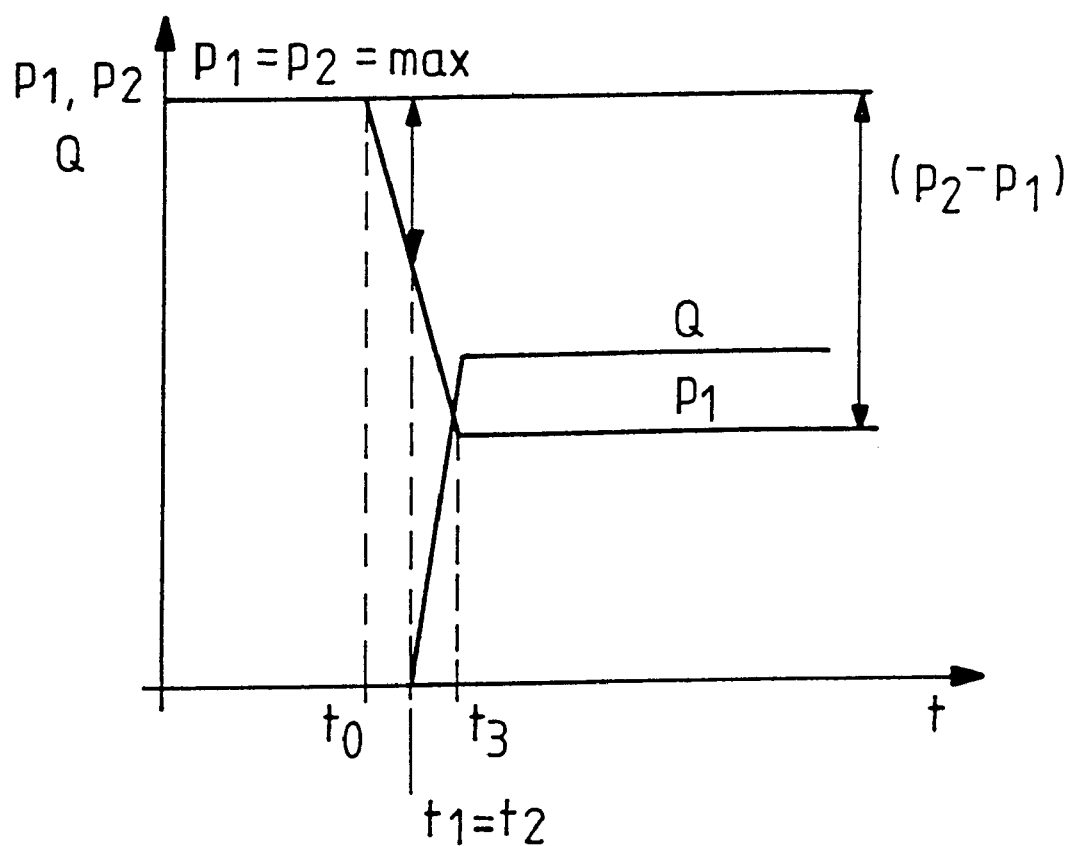
FIG. 11 is a diagram explaining actuation of the valve assemblies of the invention in accordance with a third method.

In FIG. 11 a third alternative of a control method according to the invention is represented. Accordingly, both control pressures p1 and p2 are set to a maximum value at the beginning of control, so that equivalent control pressures are applied on both control sides of the directional control valve 4—accordingly the control pressure difference is Zero at the beginning of control. By this measure the directional control valve 4 remains in its cut-off position designated by (0), and both the supply-side and drain-side throttle device 6 are taken into a position presenting a maximum open cross-section. After a time to, the control pressure p1 for the supply-side throttle device 6 is lowered and the control pressure p2 set to the maximum value is maintained. The control pressure p1 is lowered until the desired control pressure difference p2–p1 is established. By lowering the control pressure p1, a control pressure difference sufficient for overcoming the force of the pressure spring 30 of the directional control valve 4 is attained after a time $t_1$, so that the said directional control valve is taken into its flow positions designated by (b), and the volumetric flow Q to the user 116 rises. At the same time the open cross-section of the supply-side throttle device 6 is controlled closed by the dropping control pressure p1, so that the force of the check spring 74 may take the throttle device 6 into its check position after the predetermined control pressure difference was attained. After the predetermined control pressure difference (p2–p1) is attained, both control pressures p1, p2 are kept constant, so that the volumetric hydraulic flow Q also remains at a constant level.

All of the above described methods share the feature that the drain-side throttle device is, following adjustment of the predetermined control pressure difference, opened so far that the pressure losses in return flow of the hydraulic oil from the user via the throttle device 6 toward the tank T are reduced. By this measure it becomes possible to do away with additional means such as, for example, non-pressurised tank returns, so that the constructional design of the hydraulic system is minimum in comparison with conventional solutions.

It is another advantage that the valve assembly in accordance with the invention is very flexible in its application as, for example, motors having one and two directions of rotation may be driven at minimum energy loss.

The invention may be employed with particular advantage in utility vehicles such as, for example, farming tractors, with the following applications being obvious:

drain control for traction loads;

lift of a single-action cylinder without drain control of the cylinder side relieved toward the tank;

motor operation with clockwise rotation, and motor operation with counterclockwise rotation, wherein the volumetric supply flow and the degree of opening of the drain throttle are adjustable by the operator through suitable actuating members.

For adjustment of the active direction and for determining of the volumetric flow (quantity) it might, for example, be possible to choose separate actuating members such as, for example, a switch and potentiometer, or both functions might even be combined in a one-lever member such as, for example, a joystick. The desired drain control mode may be adjusted, for example, by means of a switch (single or multiple position switch) or by means of a suitable menu control on a display, so that the operator may adjust the desired supply and drain control in a simple manner.

What is disclosed is a valve assembly for actuation of a user and a method for actuation of the valve assembly, wherein a supply throttle device and a drain throttle device may be controlled independent of each other. In the case of single-action users the drain throttle device is controlled such that, upon attaining the desired volumetric flow of hydraulic oil, the open cross-section of the drain throttle is maximum, whereby the energy losses in the drain conduit are reduced to minimum.

What is claimed is:

1. A valve assembly for actuation of a user, comprising:
a continuously adjustable directional control valve acting as a supply throttle that connects a pump port to user ports, the control valve having control sides;
work conduits that connect the user to the directional control valve;
a throttle device arranged in each work conduit such that the drain volumetric flow of hydraulic oil from said user may be adjusted, the throttle device having control sides;
control conduits and control units that connect each control side of said throttle device with one control side of said directional control valve, respectively;
wherein the control units adjust the control pressures in said control conduits independently from each other to values greater than 0.

2. A valve assembly according to claim 1, wherein said throttle device is taken into a switching position in which it acts as a non-return valve, and into further positions with variable through-flow, by the control pressure.

3. A valve assembly according to claim 2, wherein an equivalent control signal may be applied to a control side of said throttle device and a control side of said directional control valve.

4. A valve assembly according to claim 1, wherein said throttle device includes (i) a main poppet permitting flow of hydraulic oil to said user and biased against a valve seat, and (ii) a push-open piston which, by means of the control pressure, is capable of being taken into contact position at said poppet in order to bring about drain throttling.

5. A valve assembly according to claim 1, wherein said throttle device is designed as a directional control valve throttle including a non-return switching position and several continuously adjustable flow positions.

6. A valve assembly according to claim 1, wherein said directional control valve is a continuously adjustable 3-way directional control valve including a cut-off position and supply positions in which a pump port is connected to one of said two work conduits.

7. Method for actuation of a valve assembly in accordance with claim 1 comprising a directional control valve acting as a supply throttle through which a pump conduit is connected to a work conduit of a user, and comprising throttle devices having check positions including a non-return valve and a metering control land positioned in the work conduits for throttling the volumetric drain flow from the user, said method comprising the steps of:

a) adjusting the volumetric supply flow to said user by actuating said directional control valve; and b) controlling the drain-side throttle device to be entirely open, wherein step a) may be performed before or after step b).

8. Method according to claim 7, comprising the steps of:

applying a control pressure difference to the control sides of said directional control valve; and applying the control pressures forming the control pressure difference to the control side of said drain and supply-side throttle devices, wherein the control pressures are chosen such that said throttle device arranged in said supply-side work conduit is taken into the check position, and said drain-side throttle device is taken into the position of maximum open cross-section.

9. Method according to claim 8, comprising the steps of:

increasing the control pressure for said drain-side throttle device at constant control pressure for the supply-side throttle device until the predetermined control pressure difference is established at said directional control valve, and increasing both control pressures while retaining the control pressure difference until said drain-side throttle device is controlled to be entirely open.

10. Method according to claim 8, comprising the steps of:

increasing the control pressure for said drain-side throttle device with a higher pressure gradient than the one for said supply-side throttle device until the control pressure difference is established and said drain-side throttle device is controlled to be entirely open.

11. Method according to claim 8, comprising the steps of:

adjusting a maximum control pressure, so that both throttle devices are controlled to be entirely open, and lowering the control pressure for said supply-side throttle device and retaining the other control pressure until the predetermined control pressure difference is established at said directional control valve.

12. Method for actuation of a valve assembly comprising a directional control valve acting as a supply throttle through which a pump conduit is connected to a work conduit of a user, and comprising throttle devices having check positions including a non-return valve and a metering control land positioned in the work conduits for throttling the volumetric drain flow from the user, said method comprising the steps of:

a) adjusting the volumetric supply flow to said user by actuating said directional control valve by adjusting control pressures acting on the control sides of the directional control valve by means of two control units;

b) controlling a drain-side throttle device of the throttle devices to be entirely open; and c) switching the supply-side throttle device of the throttle devices in its non-return position;

wherein step a) may be performed before or after step b).

13. Method according to claim 12, comprising the steps of:

applying a control pressure difference to the control sides of said directional control valve; and applying the control pressures forming the control pressure difference to the control side of said drain and supply-side throttle devices, wherein the control pressures are chosen such that said throttle device arranged in said supply-side work conduit is taken into the check position, and said drain-side throttle device is taken into the position of maximum open cross-section.

14. Method according to claim 13, comprising the steps of:

increasing the control pressure for said drain-side throttle device at constant control pressure for the supply-side throttle device until the predetermined control pressure difference is established at said directional control valve, and increasing both control pressures while retaining the control pressure difference until said drain-side throttle device is controlled to be entirely open.

15. Method according to claim 13, comprising the steps of:

increasing the control pressure for said drain-side throttle device with a higher pressure gradient than the one for said supply-side throttle device until the control pressure difference is established and said drain-side throttle device is controlled to be entirely open.

16. Method according to claim 13, comprising the steps of:

adjusting a maximum control pressure, so that both throttle devices are controlled to be entirely open, and lowering the control pressure for said supply-side throttle device and retaining the other control pressure until the predetermined control pressure difference is established at said directional control valve.

* * * * *